(12) United States Patent
Shiota et al.

(10) Patent No.: US 7,477,230 B2
(45) Date of Patent: Jan. 13, 2009

(54) DISPLAY DEVICE AND GLASS SUBSTRATE THEREFOR

(75) Inventors: Motoji Shiota, Nara (JP); Tohru Arima, Sakai (JP)

(73) Assignee: Sharp Kabushiki Kaisha, Osaka (JP)

( * ) Notice: Subject to any disclaimer, the term of this patent is extended or adjusted under 35 U.S.C. 154(b) by 846 days.

(21) Appl. No.: 11/079,146

(22) Filed: Mar. 14, 2005

(65) Prior Publication Data

US 2005/0200797 A1 Sep. 15, 2005

(30) Foreign Application Priority Data

Mar. 15, 2004 (JP) ............................. 2004-072015
Mar. 7, 2005 (JP) ............................. 2005-062736

(51) Int. Cl.
G09G 3/36 (2006.01)

(52) U.S. Cl. ...................................... 345/103; 345/100

(58) Field of Classification Search .................. 345/87, 345/98, 100, 103, 204, 206
See application file for complete search history.

(56) References Cited

U.S. PATENT DOCUMENTS

| 5,268,678 | A | * | 12/1993 | Nakazawa et al. ............ 345/93 |
| 6,169,593 | B1 | * | 1/2001 | Kanaya et al. ............... 349/187 |
| 6,590,629 | B1 | | 7/2003 | Hirobe et al. |
| 6,731,266 | B1 | * | 5/2004 | Jung ............................ 345/103 |
| 2001/0022571 | A1 | * | 9/2001 | Nakano et al. ................. 345/98 |
| 2003/0179171 | A1 | * | 9/2003 | Toriumi ........................ 345/89 |

FOREIGN PATENT DOCUMENTS

| JP | 05-181153 | 7/1993 |
| KR | 1999-0074691 | 10/1999 |
| KR | 2002-0022258 | 3/2002 |

* cited by examiner

*Primary Examiner*—Ricardo L Osorio
(74) *Attorney, Agent, or Firm*—Keating & Bennett, LLP

(57) ABSTRACT

First to fourth gate driver ICs G1 to G4 to be connected to a gate line 18 of a drive element 21 are arranged along a side of a liquid crystal display 2. Along a side of the first to four gate driver ICs G1 to G4, a FPC 5 for receiving signals is arranged. A first bus line 15 that branches between the first and second gate driver ICs G1 and G2 connects gate-low terminals 11b and 11a of the first and second gate driver ICs G1 and G2, respectively, to the FPC 5. A second bus line 16 that branches between the third and fourth gate driver ICs G3 and G4 connects gate-low terminals 11b and 11a of the third and fourth gate driver ICs G3 and G4, respectively, to the FPC 5. Gate-high terminals 10b and 10a, logic terminals 12b and 12a, and signal terminals 13 of the second and third gate driver ICs G2 and G3 are connected to the FPC 5. Gate-high terminals 10a and 10b, logic terminals 12a and 12b, and signal terminals 13 of the first and fourth gate driver ICs G1 and G4 are connected to corresponding terminals of the second and third gate driver ICs G2 and G3.

15 Claims, 3 Drawing Sheets

DISPLAY DEVICE AND GLASS SUBSTRATE THEREFOR

This application is based on Japanese Patent Application No. 2004-072015 filed on Mar. 15, 2004 and Japanese Patent Application No. 2005-062736 filed on Mar. 7, 2005, the contents of which are hereby incorporated by reference.

BACKGROUND OF THE INVENTION

1. Field of the Invention

The present invention relates to displays, such as liquid crystal displays, having a driver IC that drives a drive element provided for each pixel of a display element. The present invention also relates to a glass substrate on which the display element and the driver IC are mounted.

2. Description of Related Art

A conventional liquid crystal display is disclosed in Japanese Patent Application Laid-open No. H5-181153. This liquid crystal display has a liquid crystal display portion and a driver IC formed on a glass substrate. On the liquid crystal display portion, pixels including common electrodes formed on the opposing glass substrate are arrayed in a matrix. Each pixel is provided with a drive element made of a TFT. Each drive element is fed with a signal from the driver IC.

FIG. 4 is a plan view showing the wiring condition of the liquid crystal display. The liquid crystal display 1 has first to fourth gate driver ICs G1 to G4 aligned in such a manner as to face one side of the liquid crystal display portion 2. Due to the trend toward a crystal display portion with increasingly higher resolution, four driver ICs are used.

The first to fourth gate driver ICs G1 to G4 are bonded face-down to the glass substrate 3, and thus provided in a COG (Chip On Glass) system. The first to fourth gate driver ICs G1 to G4 feed a high level or low level signal to be supplied to the gate of each drive element.

A plurality of source driver ICs S1 to Sn are aligned in such a manner as to face one side of the liquid crystal display portion 2 which side is adjacent to the side facing the first to fourth gate driver ICs G1 to G4. The source driver ICs S1 to Sn feed a picture signal to be supplied to the source of each drive element.

The first to fourth gate driver ICs G1 to G4 each have: input terminals 10a and 10b for a high level signal to be supplied to the gate of a drive element (hereinafter referred to as "gate-high terminals"); input terminals 11a and 11b for a low level signal to be supplied to the gate of a drive element (hereinafter referred to as "gate-low terminals"); input terminals 12a and 12b for drive source of the first to fourth gate driver ICs G1 to G4; and a signal terminal 13 for receiving a signal of scanning timing.

The terminals are symmetrically arranged with respect to the center line perpendicular to the direction in which the first to fourth gate driver ICs G1 to G4 are aligned (hereinafter referred to as "column direction"). This permits a connection position to be changed in accordance with the positions where the first to fourth gate driver ICs G1 to G4 are arranged. Thus, a common package can be used for the first to fourth gate driver ICs G1 to G4.

The glass substrate 3 has a plurality of conductors 14 so formed as to extend from the terminals of the first to fourth gate driver ICs G1 to G4 to the end portion of the glass substrate 3. Each of the conductors 14 is connected to a predetermined position of a FPC 5, to which a circuit substrate (not shown), etc. are connected. This permits each terminal of the first to fourth gate driver ICs G1 to G4 to receive a predetermined signal.

The conductors 14a that are connected to the gate-low terminals 11a and 11b of the first to fourth gate driver ICs G1 to G4 are so formed as to extend toward the FPC 5 in the direction substantially perpendicular to the column direction. This permits formation of the conductors 14a of the shortest and same length, thus reducing impedance and equalizing voltage drops caused by impedance.

Similarly, the conductors 14 connected to the other terminals that receive signals of the same type are so formed as to have the same distance from the FPC 5 and the same length. The same arrangement applies to conductors for the source driver ICs S1 to Sn on the source side. This reduces the voltage drop in the conductors 14 and also equalizes voltages fed by the conductors 14, thereby providing the crystal liquid display 1 with good visibility.

However, with the conventional liquid crystal display 1 described above, the conductors 14 extend from the respective terminals in substantially perpendicular to the column direction, so that a width A of the FPC 5 becomes large in the column direction. This results in a large-size liquid crystal device 1, making it difficult to effectively use the space on either side of the FPC in the column direction, which leads to upsizing of a device on which the liquid crystal display is mounted.

SUMMARY OF THE INVENTION

It is an object of the present invention to provide a display and a glass substrate for a display that can achieve the downsizing of a device.

To achieve the above-mentioned object, in one aspect of the present invention, a display includes: a substrate; a display portion in which pixels having drive elements are arrayed in a matrix on the substrate; first to fourth driver ICs which are so mounted as to be aligned in order along a side of the display portion on the substrate and which drive the drive elements; and a wiring component which is connected to the substrate and receives signals to be supplied to the first to fourth driver ICs. The first and second driver ICs have first signal input terminals which are capable of receiving the same signal and so located as to face each other. The third and fourth driver ICs have first signal input terminals which are capable of receiving the same signal and so located as face each other. Formed on the substrate are: a first bus line which connects together the first signal input terminals of the first and second driver ICs and which branches between the first and second driver ICs so as to be connected to the wiring component; and a second bus line which connects together the first signal input terminals of the third and fourth driver ICs and which branches between the third and fourth driver ICs so as to be connected to the wiring component.

In another aspect of the present invention, a glass substrate for a display includes the following: a display element region on which is arranged a display element having pixels which include drive elements and are arrayed in a matrix; a first to fourth driver regions on which first to fourth driver ICs for driving the drive elements are so arranged as to be aligned along a side of the display element region, the first and second driver region having first signal input terminals so located to face each other, and the third and fourth driver regions having first signal input terminals so located as to face each other; a wiring component region to which is connected a wiring component receiving a signal to be supplied to the first to fourth driver ICs; a first bus line which connects together the first signal input terminals of the first and second driver regions and which branches between the first and second driver regions so as to be connected to the wiring component region; and a second bus line which connects together the first signal input terminals of the third and fourth driver regions and which branches between the third and fourth driver regions so as to be connected to the wiring component region.

DETAILED DESCRIPTION OF PREFERRED EMBODIMENTS

Figure 1:
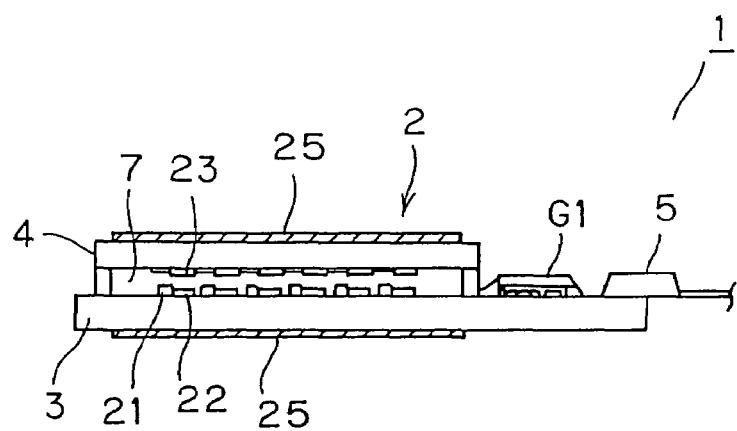
FIG. 1 is a side sectional view showing a liquid crystal display of an embodiment of the present invention.
Figure 4:
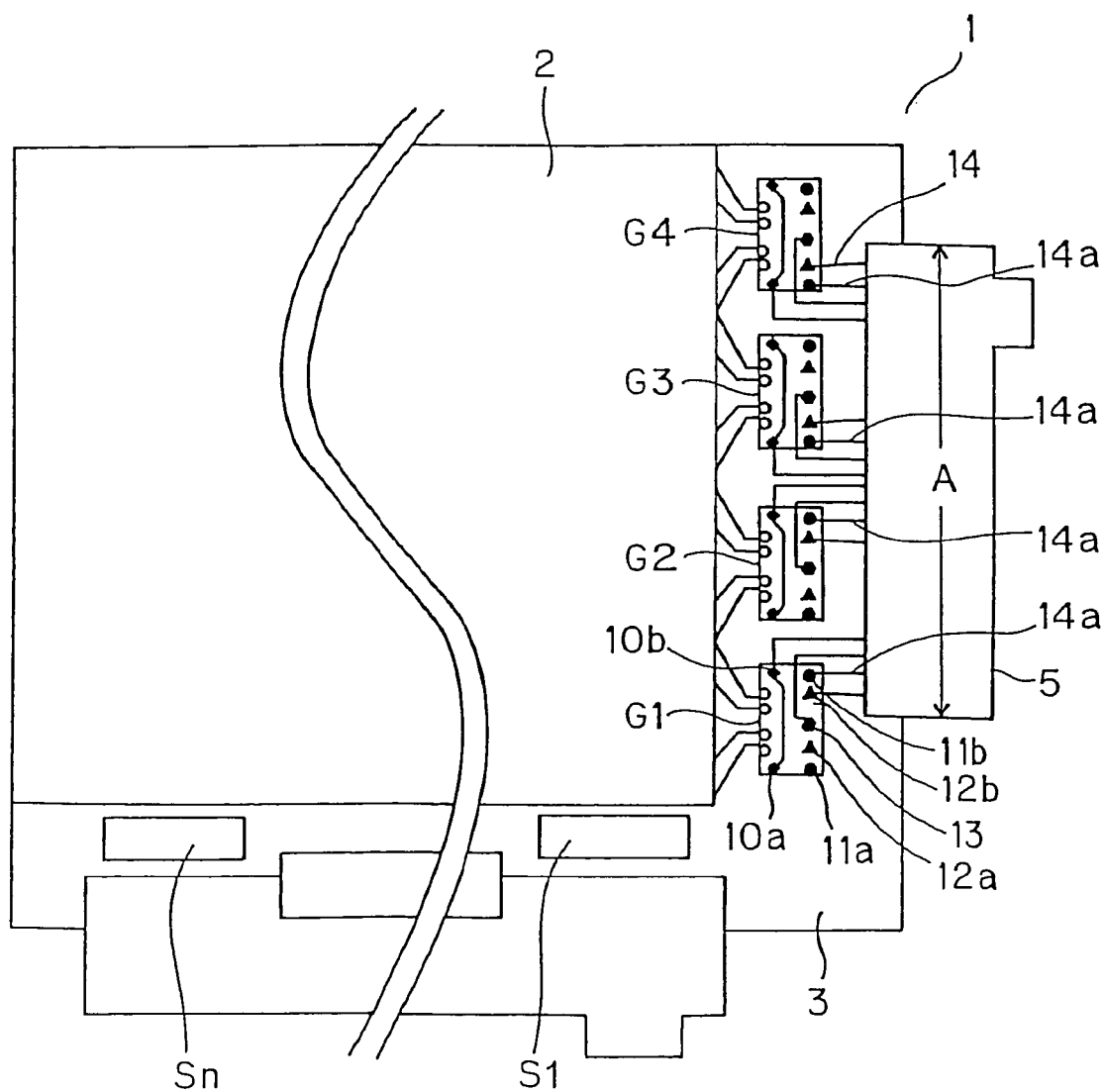
FIG. 4 is a plan view showing a conventional liquid crystal display.

The embodiment of the present invention will be described hereinafter with reference to the accompanying drawings. For simplified description, portions equivalent to those of FIG. 4 described above are given with the same numerals. FIG. 1 is a side sectional view showing a liquid crystal display of an embodiment of the invention. The liquid crystal display 1 has a liquid crystal display portion 2, which is provided on a display element region (not shown) of a glass substrate 3. Between the glass substrates 3 and 4 that are arranged opposite to each other, there is formed a liquid crystal cell in which liquid crystal 7 is sealed. Polarizing plates 25 are provided on the outer surfaces of the glass substrates 3 and 4, respectively.

On the glass substrate 3, drive elements 21 formed of a TFT and pixel electrodes 22 are arrayed in a matrix. On the glass substrate 4, common electrodes 23 are so provided as to face the pixel electrodes 22. As a result, pixels are formed and arrayed in a matrix.

Figure 2:
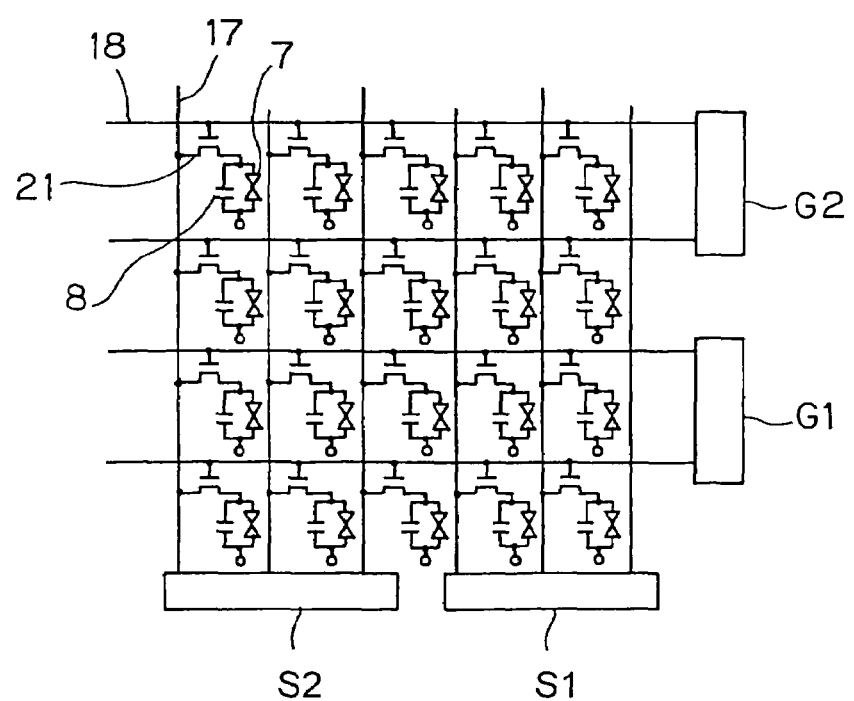
FIG. 2 is a circuit diagram showing the liquid crystal display portion of the liquid crystal display of the embodiment.

FIG. 2 is a circuit diagram of the liquid crystal display portion 2. The drain of each drive element 21 is connected to the capacitance of the liquid crystal 7 and holding capacitance 8. The source of each drive element 21 is connected via a source line 17 to first to fourth source driver ICs S1 to S4 (see FIG. 3) aligned in such a manner as to face one side of the liquid crystal display portion 2. The gate of each drive element 21 is connected via a gate line 18 orthogonal to the source line 17 to first to fourth gate driver ICs G1 to G4 (see FIG. 3) aligned in such a manner as to face another side of the liquid crystal display portion 2.

The first to fourth gate driver ICs G1 to G4 supply a high level or low level signal to the gate of each drive element 21. The first to fourth source driver ICs S1 to S4 supply a picture signal to the source of each drive element 21. When the gate of a drive element 21 becomes high, the drive element 21 becomes conductive, so that a picture signal is written into the capacitance of the liquid crystal 7.

Figure 3:
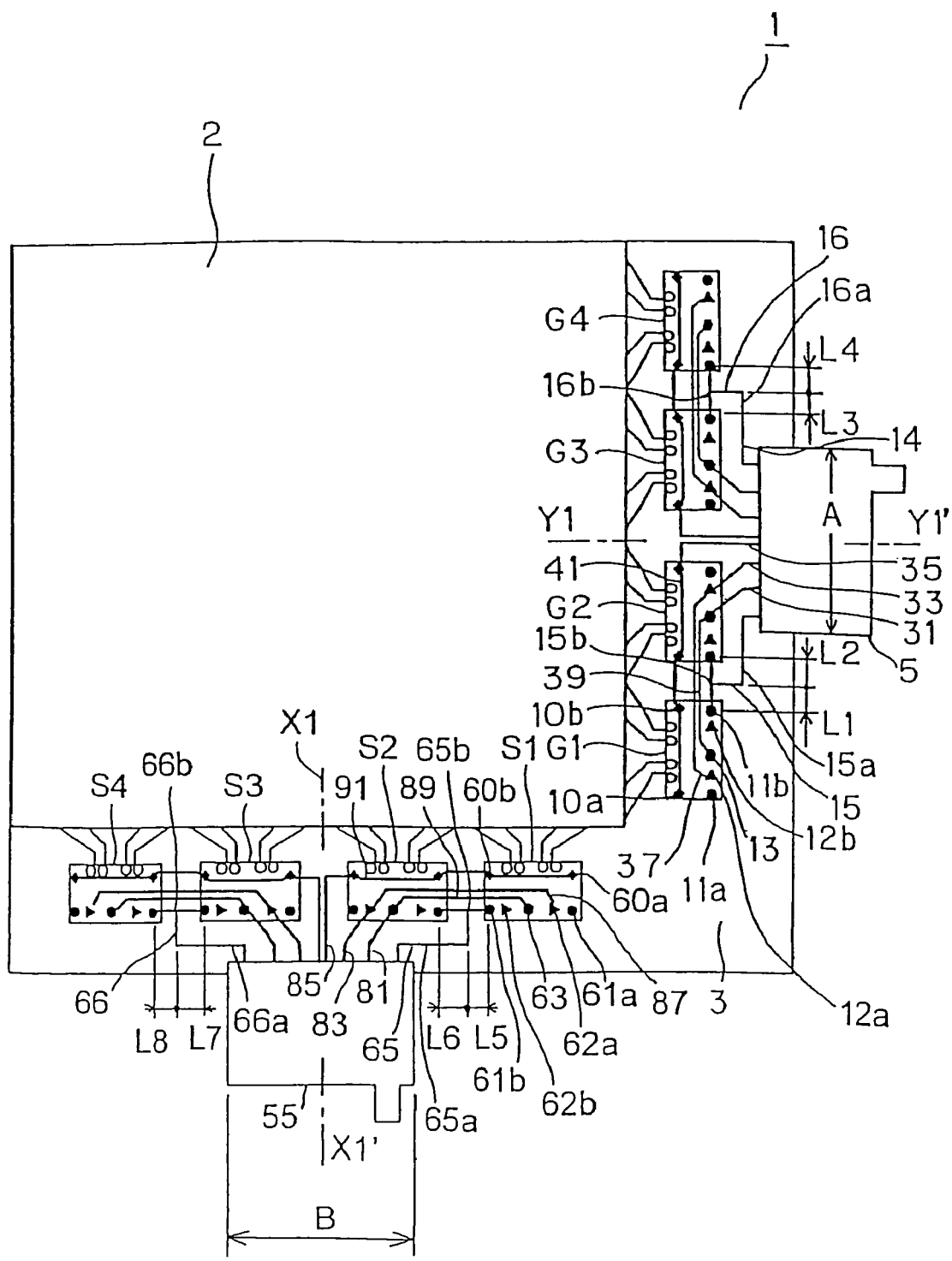
FIG. 3 is a plan view showing the liquid crystal display of the embodiment.

FIG. 3 is a plan view of the liquid crystal display 1. The first to fourth gate driver ICs G1 to G4 and the first to fourth source driver ICs S1 to S4 are connected by being bonded face-down to first to fourth gate driver regions (not shown) and first to fourth source driver regions, respectively, on the glass substrate 3, and thus provided in a COG system. The first to fourth gate driver ICs G1 to G4 are aligned in the column direction in order so as to face the liquid crystal display portion 2. The first to fourth source driver ICs S1 to S4 are aligned in order in the direction orthogonal to the column direction (hereinafter referred to as "row direction") so as to face the liquid crystal display portion 2.

The first to fourth gate driver ICs G1 to G4 each have gate-high terminals 10a and 10b, gate-low terminals 11a and 11b (first signal input terminals), logic terminals 12a and 12b (third signal input terminals), and a signal terminal 13 (second signal input terminal). The terminals are symmetrically arranged with respect to the center line perpendicular to the column direction in which the first to fourth gate driver ICs G1 to G4 are aligned. This permits a connection position to be selected in accordance with the arrangement of the first to fourth gate driver ICs G1 to G4, and thus permits the use of a common package for the first to fourth gate driver ICs G1 to G4.

The gate-high terminals 10a and 10b, and the gate-low terminals 11a and 11b are arranged into two columns, with the gate-high terminals 10a and 10b on both ends of each of the first to fourth gate driver ICs G1 to G4, and with the gate-low terminals 11a and 11b on both ends of each of the first to fourth gate driver ICs G1 to G4. The signal terminal 13 is arranged between the gate-low terminals 11a and 11b. The logic terminal 12a is arranged between the gate-low terminal 11a and the signal terminal 13, and the logic terminal 12b is arranged between the gate-low terminal 11b and the signal terminal 13. To avoid a complicated figure, no numerals are provided to the terminals of the second to fourth gate driver ICs G2 to G4. The terminals arranged on the same positions as those of the first gate driver IC G1 are described by using the same numerals.

The glass substrate 3 has a plurality of conductors 14 each so formed as to extend from a predetermined terminal of the first to fourth gate driver ICs G1 to G4 to an end portion of the glass substrate 3. Each of the conductors 14 is connected to a predetermined position of a FPC5 (wiring component) that is mounted on a wiring component region on the glass substrate 3. The FPC 5 is connected to a circuit substrate (not shown), etc. This permits each terminal to receive a predetermined signal from the FPC 5.

A first bus line 15 connects together the gate-low terminal 11b of the first gate driver IC G1 and the gate-low terminal 11a of the second gate driver IC G2 adjacent thereto. The first bus line 15 forms a T-shaped branch between the first and second gate driver ICs G1 and G2 so as to be connected to the FPC 5. This permits connection between the FPC 5 and the gate-low terminals of the first and second gate driver ICs G1 and G2 by use of the single first bus line 15.

Similarly, a second bus line 16 connects together the gate-low terminal 11b of the third gate driver IC G3 and the gate-low terminal 11a of the fourth gate driver IC G4 adjacent thereto. The second bus line 16 forms a T-shaped branch between the third and fourth gate driver ICs G3 and G4 so as to be connected to the FPC 5. This permits connection between the FPC 5 and the gate-low terminals of the third and fourth gate driver ICs G3 and G4 by use of the single second bus line 16.

The first bus line 15 branches at a branch point 15b located in the middle between the first and second gate driver ICs G1 and G2. A distance L1 between the branch point 15b and the gate-low terminal 11b of the first gate driver IC G1 is equal to a distance L2 between the branch point 15b and the gate-low terminal 11a of the second gate driver IC G2. The line width between the branch point 15b and the gate-low terminal 11b of the first gate driver IC G1 is equal to the line width between the branch point 15b and the gate-low terminal 11a of the second gate driver IC G2. The distance between the branch point 15b and the FPC5 is equal to the distances L1 and L2.

Similarly, a distance L3 between a branch point 16b of the second bus line 16 and the gate-low terminal 11b of the third gate driver IC G3 is equal to a distance L4 between the branch point 16b and the gate-low terminal 11a of the fourth gate driver IC G4. The line width between the branch point 16b of the second bus line 16 and the gate-low terminal 11b of the third gate driver IC G3 is equal to the line width between the branch point 16b and the gate-low terminal 11a of the fourth gate driver IC G4. The distance between the branch point 16b and the FPC 5 is equal to the distances L3 and L4.

The signal terminal 13 of the second gate driver IC G2 is connected to the FPC 5 by a conductor 31. The signal terminal 13 of the first gate driver IC G1 is connected to the signal terminal 13 of the second gate driver IC G2 by a conductor 39. The conductor 39 is so formed as to pass below and between the first and second gate driver ICs G1 and G2. This permits preventing short-circuit with the first bus line 15 and also reducing the number of conductors to be connected to the FPC 5.

Similarly, the logic terminal 12b of the second gate driver IC G2 is connected to the FPC 5 by a conductor 33. The logic terminal 12a of the first gate driver IC G1 is connected to the logic terminal 12b of the second gate driver IC G2 by a conductor 37. The conductor 37 is so formed as to pass below and between the first and second gate driver ICs G1 and G2.

Further, the gate-high terminal 10b of the second gate driver IC G2 is connected to the FPC 5 by a conductor 35. The gate-high terminal 10a of the second gate driver IC G1, and the gate-high terminals 10a and 10b of the first gate driver IC G1 are connected to the gate-high terminal 10b of the second gate driver IC G2 by a conductor 41. The conductor 41 is so formed as to pass below and between the first and second gate driver ICs G1 and G2.

The same applies to the third and fourth gate driver ICs G3 and G4. Specifically, the signal terminal 13, the logic terminal 12a, and the gate-high terminal 10a of the third gate driver IC G3 are connected to the FPC 5 by respective conductors. The signal terminal 13, the logic terminal 12b, and the gate-high terminals 10a and 10b of the fourth gate driver IC G4 are connected to the signal terminal 13, the logic terminal 12a, and the gate-high terminal 10a, respectively, of the third gate driver IC G3 by conductors that pass below and between the third and fourth gate driver ICs G3 and G4.

The conductors are symmetrically formed with respect to the central line Y1-Y1' that extends from the middle between the second and third gate driver ICs G2 and G3 in the direction perpendicular to the column direction. Accordingly, signals fed to the first and second gate driver ICs G1 and G2 and signals fed to the third and fourth gate driver ICs G3 and G4 are of the same magnitude. This, therefore, prevents extreme voltage change from occurring at the center of the display screen, which in turn prevents appearance of image borders.

As the first to fourth gate driver ICs G1 to G4, the first to fourth source driver ICs S1 to S4 each have source-high terminals 60a and 60b, source-low terminals 61a and 61b (first signal input terminals), logic terminals 62a and 62b (third signal input terminals), and a signal terminal 63 (second signal input terminal). The terminals are symmetrically arranged with respect to the center line perpendicular to the row direction in which the first to fourth source driver ICs S1 to S4 are aligned. This permits a connection position to be selected in accordance with the arrangement of the first to fourth source driver ICs S1 to S4, and thus permits the use of a common package for the first to fourth source driver ICs S1 to S4.

The source-high terminals 60a and 60b, and the source-low terminals 61a and 61b are arranged into two rows, with the source-high terminals 60a and 60b on both ends of each of the first to fourth source driver ICs S1 to S4, and with the source-low terminals 61a and 61b on both ends of each of the first to fourth source driver ICs S1 to S4. The signal terminal 63 is arranged between the source-low terminals 61a and 61b. The logic terminal 62a is arranged between the source-low terminal 61a and the signal terminal 63, and the logic terminal 62b is arranged between the source-low terminal 61b and the signal terminal 63. To avoid a complicated figure, no numerals are provided to the terminals of the second to fourth source driver ICs S2 to S4. The terminals arranged on the same positions as those of the first source driver IC S1 are described by using the same numerals.

The glass substrate 3 has a plurality of conductors 14 each so formed as to extend from a predetermined terminal of the first to fourth source driver ICs S1 to S4 to an end portion of the glass substrate 3. Each of the conductors 14 is connected to a predetermined position of a FPC 55 (wiring component) that is mounted on a wiring component region on the glass substrate 3. The FPC 55 is connected to a circuit substrate (not shown), etc. This permits each terminal to receive a predetermined signal from the FPC 55.

A first bus line 65 connects together the source-low terminal 61b of the first source driver IC S1 and the source-low terminal 61a of the second source driver IC S2 adjacent thereto. The first bus line 65 forms a T-shaped branch between the first and second source driver ICs S1 and S2 so as to be connected to the FPC 55. This permits connection between the FPC 55 and the gate-low terminals of the first and second source driver ICs S1 and S2 by use of the single first bus line 65.

Similarly, a second bus line 66 connects together the source-low terminal 61b of the third source driver IC S3 and the source-low terminal 61a of the fourth source driver IC S4 adjacent thereto. The second bus line 66 forms a T-shaped branch between the third and fourth source driver ICs S3 and S4 so as to be connected to the FPC 55. This permits connection between the FPC 55 and the gate-low terminals of the third and fourth source driver ICs S3 and S4 by use of the single second bus line 66.

The first bus line 65 branches at a branch point 65b located in the middle between the first and second source driver ICs S1 and S2. A distance L5 between the branch point 65b and the source-low terminal 61b of the first source driver IC S1 is equal to a distance L6 between the branch point 65b and the source-low terminal 61a of the second source driver IC S2. The line width between the branch point 65b and the source-low terminal 61b of the first source driver IC S1 is equal to the line width between the branch point 65b and the source-low terminal 61a of the second source driver IC S2. The distance between the branch point 65b and the FPC 55 is equal to the distances L5 and L6.

Similarly, a distance L7 between a branch point 66b of the second bus line 66 and the source-low terminal 61b of the third source driver IC S3 is equal to a distance L8 between the branch point 66b and the source-low terminal 61a of the fourth source driver IC S4. The line width between the branch point 66b of the second bus line and the source-low terminal 61b of the third source driver IC S3 is equal to the line width between the branch point 66b and the source-low terminal 61a of the fourth source driver IC S4. The distance between the branch point 66b and the FPC 55 is equal to the distances L7 and L8.

The signal terminal 63 of the second source driver IC S2 is connected to the FPC 55 by a conductor 81. The signal terminal 63 of the first source IC S1 is connected to the signal terminal 63 of the second source driver IC S2 by a conductor 89. The conductor 89 is so formed as to pass below and between the first and second source driver ICs S1 and S2. This permits preventing short-circuit with the first bus line 65 and also reducing the number of conductors to be connected to the FPC 55.

Similarly, the logic terminal 62b of the second source driver IC S2 is connected to the FPC 55 by a conductor 83. The logic terminal 62a of the first source driver IC S1 is connected to the logic terminal 62b of the second source driver IC S2 by a conductor 87. The conductor 87 is so formed as to pass below and between the first and second source driver ICs S1 and S2.

Further, the source-high terminal 60b of the second source driver IC S2 is connected to the FPC 55 by a conductor 85. The source-high terminal 60a of the second source driver IC S1, and the source-high terminals 60a and 60b of the first source driver IC S1 are connected to the source-high terminal 60b of the second source driver IC G2 by a conductor 91. The conductor 91 is so formed as to pass below and between the first and second source driver ICs S1 and S2.

The same applies to the third and fourth source driver ICs S3 and S4. Specifically, the signal terminal 63, the logic terminal 62a, and the source-high terminal 60a of the third source driver IC S3 are connected to the FPC 55 by respective conductors. The signal terminal 63, the logic terminal 62b, and the source-high terminals 60a and 60b of the fourth source driver IC S4 are connected to the signal terminal 63, the logic terminal 62a, and the source-high terminal 60a, respectively, of the third source driver IC S3 by conductors that pass below and between the third and fourth source driver ICs S3 and S4.

The conductors are symmetrically formed with respect to the central line X1-X1' that extends from the middle between the second and third source driver ICs S2 and S3 in the direction perpendicular to the row direction. Accordingly, signals fed to the first and second source driver ICs S1 and S2 and signals fed to the third and fourth source driver ICs S3 and S4 are of the same magnitude. This, therefore, prevents extreme voltage change from occurring at the center of the display screen, which in turn prevents appearance of image borders.

With the liquid crystal display 1 structured as described above, the first and second bus lines 15 and 16, and the first and second bus lines 65 and 66 balance inputs into the gate-low terminals and the source-low terminals. This permits reducing the number of conductors 14 connected to the FPC 5 and 55. Thus, widths A and B (see FIG. 3) of the FPC 5 and 55, respectively, can be reduced to thereby achieve downsizing of the liquid crystal display 1.

Since the distances L1 and L2 are of the same value, the voltage drop between the FPC 5 and the gate-low terminal 11b of the first gate driver IC G1 becomes equal to the voltage drop between the FPC 5 and the gate-low terminal 11a of the second gate driver IC G2. Thus, variations in low level voltages fed from the first and second gate driver ICs G1 and G2 become small, thus providing a display screen of uniform image quality.

Since the distances L3 and L4 are of the same value, the voltage drop between the FPC 5 and the gate-low terminal 11b of the third gate driver IC G3 becomes equal to the voltage drop between the FPC 5 and the gate-low terminal 11a of the fourth gate driver IC G4. Thus, variations in low level voltages fed from the third and fourth gate driver ICs G3 and G4 become small, thus providing a display screen of uniform image quality.

Since the distances L5 and L6 are of the same value, the voltage drop between the FPC 55 and the source-low terminal 61b of the first source driver IC S1 becomes equal to the voltage drop between the FPC 55 and the source-low terminal 61a of the second source driver IC S2. Thus, variations in low level voltages fed from the first and the second source driver ICs S1 and S2 become small, thus providing a display screen of uniform image quality.

Since the distances L7 and L8 are of the same value, the voltage drop between the FPC 55 and the source-low terminal 61b of the third source driver IC S3 becomes equal to the voltage drop between the FPC 55 and the source-low terminal 61a of the fourth source driver IC S4. Thus, variations in low level voltages fed from the third and fourth source driver ICs S3 and S4 become small, thus providing a display screen of uniform image quality.

The first and second bus lines 15 and 16 are symmetrically arranged with respect to the center line Y1-Y1'. Thus, drop in voltages fed to the gate-low terminals of the first to fourth gate driver ICs G1 to G4 becomes equalized, thereby providing a display screen of more uniform image quality. Similarly, the first and second bus lines 65 and 66 are symmetrically arranged with respect to the center line X1-X1'. Thus, drop in voltages fed to the source-low terminals of the first to fourth source driver ICs S1 to S4 becomes equalized, thereby providing a display screen of more uniform image quality. In this regard, the connections to the gate-low terminals, in which the effect of variations in the fed voltages on the image quality is greater than that observed in the gate-high terminals, the logic terminals, and the signal terminals, can be balanced to thereby prevent degradation of image quality.

Table. 1 shows measurement results of resistance values (unit: Ω) between the FPC 5 and the respective conductors connected to the gate-high terminals, the gate-low terminals, the logic terminals, and the signal terminals of the first to fourth gate driver ICs G1 to G4. The results show the equalized resistance values of the conductors respectively connected to the gate-low terminals by the first and second bus lines 15 and 16 are equalized, thereby permitting the voltages fed to the gate-low terminals to be kept constant. The same applies to the first to fourth source driver ICs S1 to S4.

TABLE 1

| IC | Terminals | | | |
| --- | --- | --- | --- | --- |
|  | Gate-high | Gate-low | Logic | Signal |
| G1 | 88.6 | 72.1 | 314.2 | 367.7 |
| G2 | 14.3 | 72.1 | 13.3 | 91.6 |
| G3 | 14.3 | 72.1 | 13.1 | 91.8 |
| G4 | 88.6 | 72.1 | 314.2 | 368.5 |

Unit: Ω

The signals fed to the terminals undergo voltage drop in the respective driver ICs. As the first bus line 15 connects the first and second gate driver ICs G1 and G2 together while the second bus line 16 connects the third and fourth gate driver ICs G3 and G4 together, signals that have undergone voltage drop in the second and third gate driver ICs G2 and G3 are supplied to the vicinity of the center of the screen. However, since the gate-low terminals of the second and third gate driver ICs G2 and G3 receive voltages of an equal value, drastic voltage drop does not occur at the vicinity of the center of the screen, thus preventing the degradation of image quality, such as the appearance of border lines on the screen, from occurring.

Similarly, as the first bus line 65 connects the first and second source driver ICs S1 and S2 together while the second bus line 66 connects the third and fourth source driver ICs S3 and S4 together, signals that have undergone voltage drop in the second and third source driver ICs S2 and S3 are supplied to the vicinity of the center of the screen. However, since the source-low terminals of the second and third source driver ICs S2 and S3 receive voltages of an equal value, drastic voltage drop does not occur at the vicinity of the center of the screen, thus preventing the degradation of image quality, such as the appearance of border lines on the screen, from occurring.

The gate derivers IC do not handle picture signals; therefore, they do not interfere with the operation of the liquid crystal display 1 even when the resistance values of their conductors are greater than those of the conductors on the source side. Thus, if the resistance values of the conductors can be lowered, as in this embodiment, the conductors connecting with the gate-low terminals of the first to fourth gate driver ICs G1 to G4 and the conductors connecting with the source-low terminals of the first to fourth source driver ICs S1 to S4 can be balanced. If the resistance values become greater due to such factors as the material of the conductor, only the conductors connecting with the gate-low terminals of the first to fourth gate driver ICs G1 to G4 may be balanced.

The first gate driver IC G1 is connected to the FPC 5 via the connection to the second gate driver IC G2 while the fourth gate driver G4 is connected to the FPC 5 via the connection to the third gate driver IC G3. The first source driver IC S1 is connected to the FPC 55 via the connection to the second source driver IC S2 while the fourth source driver IC S4 is connected to the FPC 55 via the connection to the third source driver IC S3. This reduces the number of conductors 14 connected to the FPC 5 and 55, respectively.

The conductors 14 between the FPC 5 and the first to fourth gate drivers ICs G1 to G4 respectively can be formed between the first and second bus lines 15 and 16. The conductors between the FPC 55 and the first to fourth source drivers ICs S1 to S4 respectively can be formed between the first and second bus lines 65 and 66. Thus, the widths A and B of the FPC 5 and 55, respectively, can be reduced, thus achieving the downsizing of the liquid crystal display 1.

Between the first to fourth gate driver ICs G1 to G4 and the FPC 5, as viewed planimetrically, the first and second bus lines 15 and 16 have parallel portions 15a and 16a, respectively, which are provided in parallel to the column direction and thus in alignment with each other. Between the first to fourth source driver ICs S1 to S4 and the FPC 55, as viewed planimetrically, the first and second bus lines 65 and 66 have parallel portions 65a and 66a, respectively, which are provided in parallel to the row direction and thus in alignment with each other.

On the other hand, the conductors (31, 33, 35) connecting the FPC 5 with the signal terminal, the logic terminal, and the gate-high terminal, respectively, and the conductors (81, 83, 85) connecting the FPC 55 with the signal terminal, the logic terminal, and the gate-high terminal, respectively, are all provided in perpendicular or at a slant with respect to the column direction as viewed planimetrically, thus each having no parallel portion.

Consequently, the first to fourth gate driver ICs G1 to G4 can be arranged close to the FPC 5, thereby permitting the downsizing of the liquid crystal display 1. In addition, the first to fourth source driver ICs S1 to S4 can be arranged close to the FPC 55, thereby permitting the downsizing of the liquid crystal display 1. Moreover, one or two of the conductors (31, 33, 35) connecting the FPC 5 with the signal terminal, the logic terminal, and the gate-high terminal, respectively, and the conductors (81, 83, 85) connecting the FPC 55 with the signal terminal, the logic terminal, and the gate-high terminal, respectively, can be provided in perpendicular or at a slant with respect to the column direction as viewed planimetrically so as to achieve the downsizing of the liquid crystal display 1.

In making connections with the second gate driver IC G2, the distance between the gate-low terminal 11a connected with the first bus line 15 and the signal terminal 13 connected with the conductor 31 is greater than the distance between the logic terminal 12b connected with the conductor 33 and the signal terminal 13. This locates the conductor 31 closer to the center line Y1-Y1', thereby permitting the first bus line 15 having the parallel portion 15a to be located in close vicinity to the center line Y1-Y1'.

In making connections with the third gate driver IC G3, the second bus line 16 having the parallel portion 16a can be provided in close vicinity to the center line Y1-Y1'. This permits the width A of the FPC 5 to be reduced, thus achieving the downsizing of the liquid crystal display 1.

Similarly, in making connections with the second source driver IC S2, the distance between the source-low terminal 61a connected with the first bus line 65 and the signal terminal 63 connected with the conductor 81 is greater than the distance between the logic terminal 62b connected with the conductor 83 and the signal terminal 63. This locates the conductor 81 closer to the center line X1-X1', thereby permitting the first bus line 65 having the parallel portion 65a to be located in close vicinity to the center line X1-X1'.

In making connections with the third source driver IC S3, the second bus line 66 having the parallel portion 66a can be provided in close vicinity to the center line X1-X1'. This permits the width B of the FPC 55 to be reduced, thus achieving the downsizing of the liquid crystal display 1.

In this embodiment, four driver ICs are provided so as to be connected to the source line. Alternatively, the liquid crystal display may have driver ICs with the same structure that are provided aligned in the row direction and in a multiple number of four. The above description has been given, referring to the liquid crystal display. The same structure can be applied to different types of displays that employ, e.g. an organic EL having a drive element for each pixel, to thereby provide the same effects.

The present invention is applicable to devices having a plane display, such as cellular phones, laptop personal computers, and car navigation systems.

| LIST OF REFERENCE NUMERALS | |
| --- | --- |
| 1 | Liquid crystal display |
| 2 | Liquid crystal display portion |
| 3, 4 | Glass substrate |
| 5, 55 | FPC |
| 7 | Liquid crystal |
| 10a, 10b | Gate-high terminal |
| 11a, 11b | Gate-low terminal (First signal input terminal) |
| 12a, 12b, 62a, 62b | Logic terminal (Third signal input terminal) |
| 13, 63 | Signal terminal (Second signal input terminal) |
| 14, 31, 33, 35, 37, 39, 41, 81, 83, 85, 87, 89, 91 | Conductor |
| 15, 16, 65, 66 | First, Second bus lines |
| 15a, 16a, 65a, 66a | Parallel portion |
| 17 | Source line |
| 18 | Gate line |
| 21 | Drive element |
| 22 | Pixel electrode |
| 23 | Common electrode |
| 60a, 60b | Source-high terminal |
| 61a, 61b | Source-low terminal (First signal input terminal) |
| G1 to G4 | First to fourth gate driver ICs |
| S1 to S4 | First to fourth source driver ICs |

What is claimed is:

1. A display comprising:
   a substrate;
   a display portion in which pixels having drive elements are arrayed in a matrix on the substrate;
   first to fourth driver ICs which are so mounted as to be aligned in order along a side of the display portion on the substrate and which drive the drive elements; and
   a wiring component which is connected to the substrate and receives signals to be supplied to the first to fourth driver ICs,
   wherein the first and second driver ICs have first signal input terminals which are capable of receiving a same signal and so located as to face each other,
   wherein the third and fourth driver ICs have first signal input terminals which are capable of receiving a same signal and so located as to face each other, and
   wherein formed on the substrate are:
   a first bus line which connects together the first signal input terminals of the first and second driver ICs and which branches between the first and second driver ICs so as to be connected to the wiring component; and
   a second bus line which connects together the first signal input terminals of the third and fourth driver ICs and which branches between the third and fourth driver ICs so as to be connected to the wiring component.

2. The display of claim 1,
   wherein the first to fourth driver ICs each have on both end thereof the first signal input terminals in a direction in which the first to fourth driver ICs are aligned.

3. The display of claim 2,
   wherein a distance between a branch point of the first bus line and the first signal input terminal of the first driver IC is equal to a distance between the branch point of the first bus line and the first signal input terminal of the second driver IC, and
   wherein a distance between a branch point of the second bus line and the first signal input terminal of the third driver IC is equal to a distance between the branch point of the second bus line and the first signal input terminal of the fourth driver IC.

4. The display of claim 3,
   wherein arrangement of conductors connected to the first and second driver ICs and arrangement of conductors connected to the third and fourth driver ICs are symmetric with each other with respect to a central line which passes through a central point equidistant from the second and third driver ICs and which is perpendicular to the direction of the alignment of the first to fourth driver ICs.

5. The display of claim 1,
   wherein the first to fourth driver ICs have second and third signal input terminals which receive signals different from the signal received by the first signal input terminals,
   wherein the second and third signal input terminals of the second and third driver ICs are connected to the wiring component,
   wherein the second signal input terminals of the first and second driver ICs are connected together by the conductor which passes below and between the first and second driver ICs,
   wherein the third signal input terminals of the first and second driver ICs are connected together by the conductor which passes below and between the first and second driver ICs,
   wherein the second signal input terminals of the third and fourth driver ICs are connected together by the conductor which passes below and between the third and fourth driver ICs, and
   wherein the third signal input terminals of the third and fourth driver ICs are connected together by the conductor which passes below and between the third and fourth driver ICs.

6. The display of claim 5,
   wherein, when viewed planimetrically, the first and second bus lines each include one parallel portion which is parallel to the direction of the alignment of the first to fourth driver ICs, the parallel portions being disposed aligned with each other in a line between the first to fourth driver ICs and the wiring component, and
   wherein at least one of the conductor connecting together the second signal input terminal and the wiring component and the conductor connecting together the third signal input terminal and the wiring component does not have a parallel portion that is parallel to the direction of the alignment of the first to fourth driver ICs.

7. The display of claim 1,
   wherein the first to fourth driver ICs supply a signal to a gate of the drive element.

8. The display of claim 7,
   wherein the first signal input terminal is an input terminal via which a low level is supplied to the gate of the drive element.

9. The display of claim 1,
   wherein the substrate is made of glass, and
   wherein the first to fourth driver ICs are bonded face-down to the substrate.

10. The display of claim 1,
    wherein the display portion is made of a liquid crystal cell.

11. A glass substrate for a display, comprising the following:
    a display element region on which a display element is arranged, the display element having pixels which include drive elements and are arrayed in a matrix;
    a first to fourth driver regions on which first to fourth driver ICs for driving the drive elements are so arranged as to be aligned along a side of the display element region, the first and second driver regions having first signal input terminals so located as to face each other, the third and fourth driver regions having first signal input terminals so located as to face each other;
    a wiring component region to which a wiring component is connected, the wiring component receiving a signal to be supplied to the first to fourth driver ICs;
    a first bus line which connects together the first signal input terminals of the first and second driver regions and which branches between the first and second driver regions so as to be connected to the wiring component region; and
    a second bus line which connects together the first signal input terminals of the third and fourth driver regions and which branches between the third and fourth driver regions so as to be connected to the wiring component region.

12. The glass substrate for a display of claim 11,
    wherein a distance between a branch point of the first bus line and the first signal input terminal of the first driver region is equal to a distance between the branch point of the first bus line and the first signal input terminal of the second driver region, and
    wherein a distance between a branch point of the second bus line and the first signal input terminal of the third driver region is equal to a distance between the branch point of the second bus line and the first signal input terminal of the fourth driver region.

13. The glass substrate for a display of claim 12,
wherein arrangement of conductors connected to the first and second driver regions and arrangement of conductors connected to the third and fourth driver regions are symmetric with each other with respect to a central line which passes through a central point equidistant from the second and third driver regions and which is perpendicular to the direction of the alignment of the first to fourth driver regions.

14. The glass substrate for a display of claim 11,
wherein the first to fourth deriver regions have second and third signal input terminals,
wherein the second and third signal input terminals of the second and third driver regions are connected to the wiring component region,
wherein the second signal input terminals of the first and second driver regions are connected together by the conductor which passes across and between the first and second driver regions,
wherein the third signal input terminals of the first and second driver regions are connected together by the conductor which passes across and between the first and second driver regions,
wherein the second signal input terminals of the third and fourth driver regions are connected together by the conductor which passes across and between the third and fourth driver regions, and
wherein the third signal input terminals of the third and fourth driver regions are connected together by the conductor which passes across and between the third and fourth driver regions.

15. The glass substrate for a display of claim 14,
wherein, when viewed planimetrically, the first and second bus lines each include one parallel portion which is parallel to the direction of the alignment of the first to fourth driver regions, the parallel portions being disposed aligned with each other in a line between the first to fourth driver regions and the wiring component region, and
wherein at least one of the conductor connecting together the second signal input terminal and the wiring component region and the conductor connecting together the third signal input terminal and the wiring component region does not have a parallel portion that is parallel to the direction of the alignment of the first to fourth driver ICs.

* * * * *